Feb. 7, 1967    F. L. SAUNDERS    3,303,159
METHOD OF MAKING ARTICLES OF CRYSTALLINE POLYSTYRENE
CONTAINING LOWER POLYMERS OF ALKENYL
AROMATIC MONOMERS
Filed Jan. 11, 1962

Lower polymer of alkenyl aromatic monomer of the benzene series which is liquid at 60°C. or less.

Isotactic polystyrene

Homogeneous mixture containing at least 1 weight percent lower polymer of alkenyl aromatic monomer of the benzene series.

Formation of shaped article from homogeneous mixture at 100°C – 300°C.

Annealing shaped article at 100°C – 200°C. for 30 minutes to 2 hours to effect crystallization INVENTOR.
Frank L. Saunders
BY Griswold & Burdick
ATTORNEYS

3,303,159
METHOD OF MAKING ARTICLES OF CRYSTALLINE POLYSTYRENE CONTAINING LOWER POLYMERS OF ALKENYL AROMATIC MONOMERS
Frank L. Saunders, Midland, Mich., assignor to The Dow Chemical Company, Midland, Mich., a corporation of Delaware
Filed Jan. 11, 1962, Ser. No. 165,649
7 Claims. (Cl. 260—33.6)

This invention relates to a method for making articles from crystalline polymeric alpha-olefins. More particularly, it relates to a method for making articles from isotactic polystyrene having intimately incorporated therein small but effective amounts of certain lower polymers of alkenyl aromatic monomers of the benzene series, particularly dimers, trimers, tetramers, polymers, and suitable mixtures thereof all of which are normally liquid at temperatures of about 60° C. or less. The invention is also concerned with shaped articles fabricated by the method of this invention which exhibit increased flow rates during fabrication, a propensity for rapid crystallization from the amorphous state, and a resistance to thermally induced distortion or deformation not significantly less than partially crystalline isotactic articles formed by conventional means.

It is known that styrene monomer polymerizes through the vinyl group in a head to tail fashion to yield a polymer molecule which is a long chain of carbon atoms with hydrogen and phenyl groups attached thereto. Polystyrene with an asymmetric arrangement of phenyl groups along the carbon chain is known as atactic and polystyrene with a symmetrical arrangement of phenyl groups along the carbon chain is known as isotactic.

Atactic polystyrene lacks both crystallinity and high inter-molecular forces, either of which prevents its use above the second order transition temperature. Isotactic polystyrene, which is partially crystalline, has amorphous regions with the second order transition temperature above room temperature, which makes it brittle at use temperature; while at the same time its crystallinity confers rigidity and dimensional stability, almost up to the melting point of the crystallites. The rigidity and dimensional stability above the heat distortion temperature permits the use of isotactic polystyrene in applications where the atactic polystyrene would not be appropriate.

Isotactic polymers tend to show a high melting temperature (transition from the crystalline to the amorphous state) and a high crystallinity. In the case of crystalline isotactic polymers of styrene, the melting temperature is about 220° to 240° C. and the maximum crystallinity is generally between about 20 percent to about 45 percent as measured by X-ray diffraction patterns.

Fabrication of film, fiber and other extruded or molded articles from crystalline isotactic polystyrene is generally accomplished by heating such polymer to a temperature above its crystalline melting point, followed by cooling the molten mass to form articles which are substantially amorphous, then regaining crystallinity by subjecting such articles to a slow annealing process at temperatures above the second order transition temperature of isotactic polystyrene (about 85° to 95° C.), and below the crystalline melting point of isotactic polystyrene.

The maximum rate of crystallization of amorphous isotactic polystyrene is generally accomplished by annealing such amorphous polymer at temperatures of at least about 200° C. for periods of about 3 hours to 4 hours.

Thermal degradation or molecular weight breakdown of the polymer or articles thereof often occurs during this annealing period, and particularly during fabrication at temperatures above the crystalline melting point of isotactic polystyrene.

It is an object of this invention to provide a method of forming crystalline articles from isotactic polystyrene which have the desirable properties of increased flow during fabrication and which undergo rapid crystallization from the amorphous state while annealing said articles at a temperature significantly below 200° C.

A further object of the present invention is a method of forming articles having the desirable properties described above, and in addition thereto, having resistance to the deleterious effects of heat and solvents not significantly less than articles formed from untreated isotactic polystyrene by conventional means.

Other and related objects will become apparent from the following description of the invention.

In accordance with the present invention, the foregoing and related objects can be obtained by (1) preparing a homogeneous mixture of isotactic polystyrene (either amorphous or partially crystalline), and at least about 1 weight percent, preferably 5 to 15 weight percent, based on the weight of isotactic polystyrene of a lower polymer of an alkenyl aromatic monomer of the benzene series as described herein, (2) forming said homogeneous mixture into a shaped article, and (3) thereafter annealing the shaped article to effect crystallization thereof.

The polymeric additives finding use in the present invention include those lower polymers of alkenyl aromatic monomers of the benzene series which are capable of assuming the configuration of their container at temperatures of about 60° C. or less, such materials generally having a viscosity at 60° C. of less than about 1500 centipoises.

In the annexed drawing there is shown a flow sheet representation of the method of the present invention.

Examples of the lower polymer suitable for use in the present invention include saturated and unsaturated dimers, trimers, tetramers, polymers, and suitable mixtures thereof, of styrene, ortho-chlorostyrene, para-chlorostyrene, para-bromostyrene, and particularly those saturated and unsaturated dimers, trimers, tetramers, polymers, and suitable mixtures thereof of isopropenyl aromatic monomers of the benzene series such as alpha-methylstyrene, and its nuclearly halogen or alkyl substituted analogs exemplified by para-methyl-alpha-methylstyrene, and 3,4-dichloro-alpha-methylstyrene.

Polymers of alkenyl aromatic monomers of the benzene series which are solid at temperatures of 60° C. or less generally have limited compatibility with isotactic polystyrene and are not suitable for the purposes of the present invention.

Methods for preparing the lower polymers of alkenyl aromatic monomers as defined herein are well known to those skilled in the art, and are described among many other reference sources in U.S. 2,521,494 issued September 5, 1950.

The isotactic polystyrene component is prepared by contacting liquid styrene monomer with a stereo-specific catalyst system consisting of equimolar amounts of an organo-metallic compound of a metal from group I, II or III from the Periodic Table according to Deming ("Fundamental Chemistry," 2nd edition, published (1952) by John Wiley and Sons, Inc., New York), and a compound of a transition metal from group IV–B, V–B or VI–B of said table. Among the preferred catalysts are those obtained from a trivalent titanium halide such as $TiCl_3$ and a trialkyl aluminum such as $Al(C_2H_5)_3$.

The lower polymers of alkenyl aromatic monomers as defined herein must be present in the isotactic styrene polymer in a minimum amount of about 1 weight percent based on the weight of the isotactic polystyrene. The permissible maximum amount depends on the particular lower polymer being employed and the limit of its compatibility with the isotactic polystyrene. The maximum limit is generally about 15 weight percent, based on the weight of the isotactic styrene polymer.

It has been observed that amounts greater than about 15 weight percent based on the weight of isotactic polystyrene of the lower polymers of the alkenyl aromatic monomers, suitable for use in the present invention have a deleterious effect on the properties, e.g., heat distortion, of the partically crystalline articles produced by the methods of the present invention.

The lower polymers of alkenyl aromatic monomers useful in the present invention may be incorporated with the isotactic polystyrene at a temperature above or below the crystalline melting point of isotactic polystyrene by any convenient method, including milling, rolling, kneading, codissolving in a common solvent, or by conventional hot melt techniques.

The resulting mixture is formed into the desired shape at a plasticizing temperature below the decomposition point of the mixture, preferably at temperatures between about 100° C. and 250° C. for mixtures containing essentially amorphous (non-crystalline isotactic polystyrene, and the desired amounts of lower polymers of alkenyl aromatic monomers as described herein; and temperatures between about 250° C. and 300° C. for mixtures containing essentially partially crystalline isotactic polystyrene and the lower polymers of alkenyl aromatic monomers as defined herein.

The mixture can be formed or shaped into a partially crystalline article by molding such polymer by usual injection or compression molding operations or by extrusion methods, after which the shaped article is maintained at temperatures between about 100° C. and 200° C., preferably 150° C. and 175° C., for periods between about 30 minutes and two hours.

In a preferred embodiment of the invention the homogeneous mixture is formed by mechanically mixing at normal room temperatures dry, powdered, partially crystalline isotactic polystyrene recovered from the reaction employing stereospecific catalytic systems such as a mixture of $TiCl_3$ and $Al(C_2H_5)_3$, with sufficient amounts of a lower polymer of an alkenyl aromatic monomer as described by the present invention. The resultant mixture is heated at temperatures above the crystalline melting point of the partially crystalline isotactic polystyrene, i.e., at temperatures between 250° C. and 300° C., in a plastics extruder or in an injection molding machine, then pressed or extruded into a mold maintained at temperatures between about 100° C. and 200° C., preferably about 150° C. and 175° C., for periods of between about 30 minutes and two hours, wherein it is shaped and converted to the crystalline form, and after cooling, is removed as a partially crystalline article having a predetermined shape.

The polymer can also be extruded in the form of filaments or sheets, stretched in one or more directions and maintaining the same at temperatures between about 100° C. to 200° C., preferably about 150° C. and 175° C., to effect crystallization of the shaped polymer.

As noted previously the lower polymers of alkenyl aromatic monomers useful for the present invention may advantageously be admixed with substantially amorphous isotactic polystyrene by the methods described herein. The resulting mixture may then be pressed or extruded into a mold maintained at temperatures between about 100° C. and 200° C., preferably about 150° C. and 175° C. for periods between about 30 minutes and two hours, wherein it is shaped and converted to the crystalline form.

Mixtures of amorphous isotactic polystyrene and the lower polymers of the present invention can also be extruded in the form of filaments or sheets, stretched in one or more directions while maintaining the same at temperatures between about 100° C. and 200° C., preferably 150° C. an 175° C. to effect crystallization of the shaped polymer.

The crystalline polymer consisting of a homogeneous admixture of isotactic polystyrene and suitable lower polymer of an alkenyl aromatic monomer, and articles prepared therefrom, are useful for a variety of purposes in the home and industry. Such polymer or articles are particularly useful for applications where conventional polystyrene has heretofore been considered inadequate owing to its low heat distortion temperatures, and in applications wherein articles formed from isotactic polystyrene by conventional methods have suffered decomposition or deterioration at elevated temperatures during fabrication, and deformation and distortion while crystallizing said article from the amorphous state at temperatures of about 200° C. and over for periods ranging from about 3 to 4 hours.

The relative crystallinity of the polymer and articles prepared therefrom is determined by X-ray diffraction patterns using procedures well known in the art.

The heat distortion of such polymer or articles thereof is determined using procedures described in the ASTM Test D-1525, the procedures for which are described in the ASTM Bulletin, 1959, No. 236, Feb. 54 (TP 64) Disc. No. 241, Oct. 40 (TP 204).

The following example wherein all parts and percentages are to be taken by weight illustrates the principal of the invention, but is not to be construed as limiting its scope.

EXAMPLE 1

Into a clean dry 5-liter glass reaction vessel there was placed a charge of 8 millimoles of $Al(C_2H_5)_3$ and 8 millimoles of $TiCl_3$ to which was added 1335 ml. of n-heptane and 665 ml. of styrene. The resulting mixture was maintained at temperatures between 85° and 90° C. with stirring for a period of 3 hours in an atmosphere of dry nitrogen. A charge of 200 ml. of n-propanol containing about 2 grams of anhydrous HCl was added with stirring, and the resultant mixture heated for one hour at a temperature of 65° C. to decompose the catalytic reactants present and to coagulate the polymer formed. The polymer was recovered from the alcohol by filtration, washed with methanol, and vacuum dried at 40° C. until its weight was constant. There was obtained about 300 grams of isotactic polystyrene having a relative crystallinity of about 26 percent as determined by X-ray diffraction patterns.

In each of a series of experiments, a charge of 3 grams of isotactic polystyrene prepared by the methods described herein, was mechanically admixed at normal room temperatures with varying percentages of one of the various suitable lower polymers of alpha-methylstyrene as described in the present invention. Each of the resulting mixtures was individually placed between sheets of aluminum foil and compression molded under a ram pressure of about 20,000 pounds per square inch to form a flat molding approximately 10 mils thick. The ram pressure was maintained for about 5 minutes at a temperature of about 300° C. The resultant moldings were thereafter annealed at a temperature of 175° C. for a period of 2 hours, after which all such articles were found to be highly crystalline, tough, and flexible, having excellent resistance to the effects of heat and solvents. The composition and amounts of the additive mechanically admixed with isotactic polystyrene, and the Vicat heat distortion of the annealed articles produced therefrom, as determined by the method described in the ASTM Test D-1525, and the percent crystallinity of the annealed article as determined by X-ray diffraction patterns are reported in the following Table I.

Table I

| Run No. | Additive | Percent additive by weight of isotatic polystyrene | Vicat heat distortion of annealed article,[1] degrees C. | Percent crystallinity |
|---|---|---|---|---|
| 1 | None | 0 | 196 | 9.5 |
| 2 | Alpha methylstyrene dimer | 5 | 179 | 28 |
| 3 | ----do---- | 15 | 171 | 26 |
| 4 | ----do---- | 25 | 159 | 25 |
| 5 | Alpha methylstyrene polymer (viscosity of 100 to 200 cps. at 60° C.) | 5 | 190 | 28 |
| 6 | ----do---- | 15 | 173 | 27 |
| 7 | Alpha methylstyrene polymer (viscosity 700 to 1,000 cps. at 60° C.) | 5 | 187 | 23 |
| 8 | ----do---- | 15 | 172 | 22 |

[1] Annealing conditions: 2 hours at 175° C.

Similar desirable results are obtained using any concentration between about 1 weight percent to 15 weight percent based on the weight of partially crystalline or amorphous isotactic polystyrene of the lower polymers of alkenyl aromatic monomers as defined herein, heating such mixtures to a plasticizing temperature between about 100° C. and 250° C. for mixtures containing amorphous (noncrystalline) isotactic polystyrene and between about 250° C. and 300° C. for mixtures containing partially crystalline isotactic polystyrene; forming or shaping said mixtures by usual methods including compression molding, injection molding and extrusion into molded or filamentary articles; and thereafter annealing said articles at temperatures between about 100° C. and 200° C., preferably 150° C. and 175° C. for periods between about 30 minutes and two hours to provide maximum crystallinity and resulting desirable properties.

What is claimed is:

1. Method of making articles of isotactic polystyrene having enhanced crystallization rates which comprises (I) preparing a homogeneous mixture of isotactic polystyrene and at least 1 weight percent based on the weight of said isotactic polystyrene of a lower polymer of an alkenyl aromatic monomer of the benzene series, said lower polymer being liquid at temperatures of about 60° C. or less; (II) forming said homogeneous mixture into a shaped article at a temperature between about 100° C. and 300° C.; and (III) thereafter annealing said shaped article at a temperature between about 100° C. and 200° C. for a period between about 30 minutes to 2 hours to effect crystallization thereof.

2. The method of claim 1, wherein said homogeneous mixture comprises (a) between 85 and 95 weight percent isotactic polystyrene and (b) complementarily between 15 and 5 weight percent of poly-alpha-methyl styrene, said poly-alpha-methyl styrene having a viscosity at 60° C. of between about 100 centipoises and 1,000 centipoises.

3. The method of claim 2, wherein said homogeneous mixture is formed into a crystalline article of desired shape by heating said mixture in a mold maintained at a temperature between about 100° C. and 200° C. for a period between about 30 minutes and 2 hours.

4. The method of claim 2, wherein said homogeneous mixture is formed into a crystalline article of desired shape by (1) extruding said mixture into cavity of a mold maintained at a temperature between about 100° C. and 200° C. in an amount sufficient to fill said cavity; (2) maintaining said mixture under pressure in the mold cavity at a temperature between about 100° C. and 200° C. for a period between about 30 minutes and 2 hours, to effect crystallization thereof; and (3) thereafter cooling the crystallized mixture and removing the shaped article from the mold cavity.

5. The method of claim 2, wherein said homogeneous mixture is extruded into a filamentary structure, said filamentary structure being drawn into desired size and maintained at a temperature between about 100° C. and 200° C. for a period between about 30 minutes and 2 hours to effect crystallization thereof.

6. A crystalline article prepared from a homogeneous mixture comprised of isotactic polystyrene and at least 1 weight percent based on the weight of said isotactic polystyrene of a lower polymer of an alkenyl aromatic monomer of the benzene series, said lower polymer being a liquid at a temperature of about 60° C. less.

7. The article of claim 6, wherein said homogeneous mixture is comprised of (a) between 85 and 95 weight percent isotactic polystyrene and (b) complementarily between 15 and 5 weight percent of poly-alpha-methyl styrene, said poly-alpha-methyl styrene having a viscosity at 60° C. between about 100 centipoises and 1,000 centipoises.

References Cited by the Examiner

UNITED STATES PATENTS

| | | | |
|---|---|---|---|
| 2,864,802 | 12/1958 | Price et al. | 260—33.6 X |
| 2,997,743 | 8/1961 | Isaksen et al. | |
| 3,000,845 | 9/1961 | Doak et al. | 260—93.5 X |
| 3,052,664 | 9/1962 | Cleland et al. | 260—93.5 |

FOREIGN PATENTS

| | | |
|---|---|---|
| 621,038 | 5/1961 | Canada. |

ALEXANDER H. BRODMERKEL, *Primary Examiner.*

MICHAEL V. BRINDISI, *Examiner.*

A. L. LEAVITT, *Assistant Examiner.*